United States Patent [19]
Cummens

[11] 3,945,757
[45] Mar. 23, 1976

[54] TURBINE TYPE AIR MOTOR

[75] Inventor: Joseph R. Cummens, Elmhurst, Ill.

[73] Assignee: Onsrud Machine Works, Inc., Niles, Ill.

[22] Filed: Dec. 19, 1974

[21] Appl. No.: 534,360

[52] U.S. Cl. .................... 415/80; 415/36; 415/123; 418/40
[51] Int. Cl.² .......................................... B23B 45/04
[58] Field of Search ........... 418/40; 415/80, 36, 123

[56] References Cited
UNITED STATES PATENTS

| | | | |
|---|---|---|---|
| 3,128,079 | 4/1964 | DeGroff | 415/123 |
| 3,304,051 | 2/1967 | Calhoun | 415/80 |
| 3,712,386 | 1/1973 | Peters | 415/123 X |
| 3,733,143 | 5/1973 | Theis, Jr. | 415/80 |

*Primary Examiner*—Arnold Rosenthal
*Attorney, Agent, or Firm*—Wolfe, Hubbard, Leydig, Voit & Osann, Ltd.

[57] ABSTRACT

A turbine type air motor including a rotor and driven spindle having automatic speed regulation. The spindle and rotor have cooperating ports to control the flow of air to the rotor, and the spindle has provision for limited twisting movement within the rotor for moving the ports into and out of register. A biasing spring interposed between the spindle and rotor urges the ports normally out of register when the tool is lightly loaded. An increase in the load imposed upon the spindle causes the spindle to retreat relative to the rotor and against the force of the spring to bring the ports into register, thereby to increase the flow of air so that the torque developed by the rotor increases in step with the torque loading imposed on the spindle to maintain speed. In the preferred embodiment the spindle is of hollow construction and compressed air is fed axially into the hollow for transmission into the rotor through radial ports. In one embodiment of the invention the motor is provided with an integral valve interposed in the air line operated by a manual trigger which, upon release, applies braking force to the rotor to inhibit coasting.

11 Claims, 8 Drawing Figures

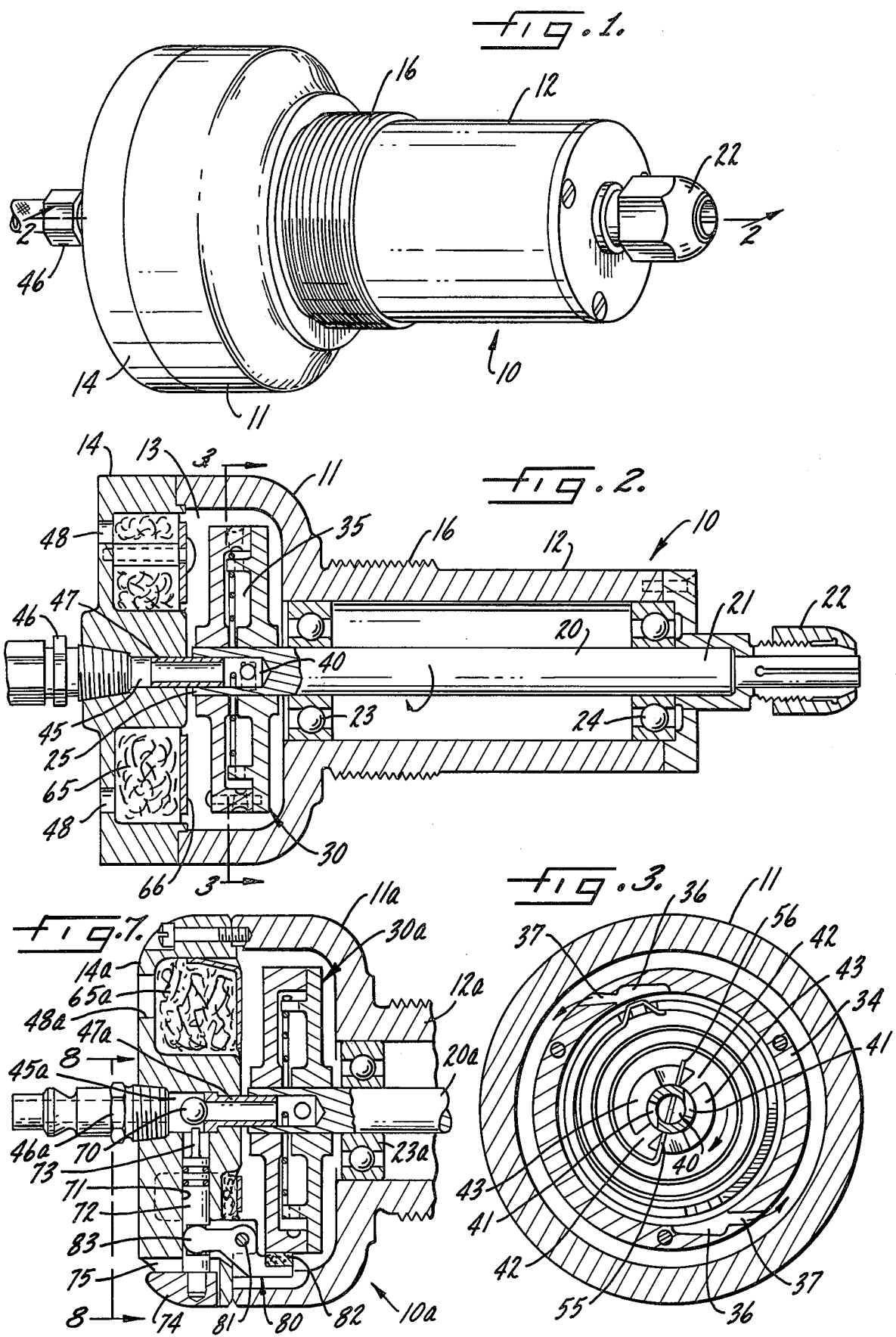

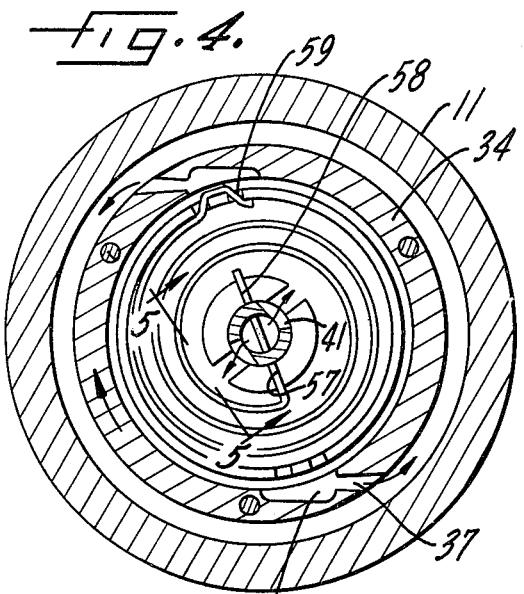
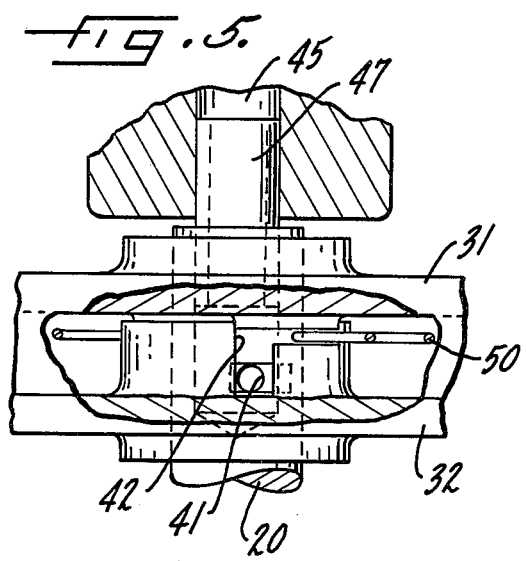
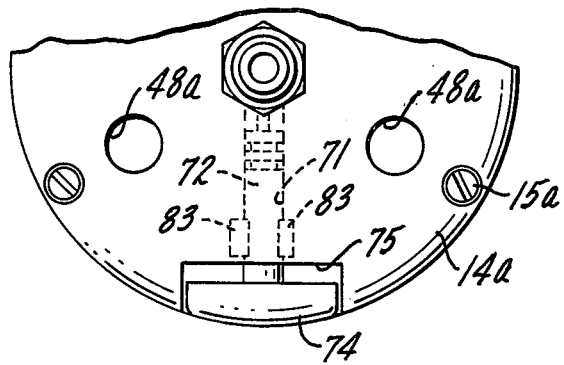
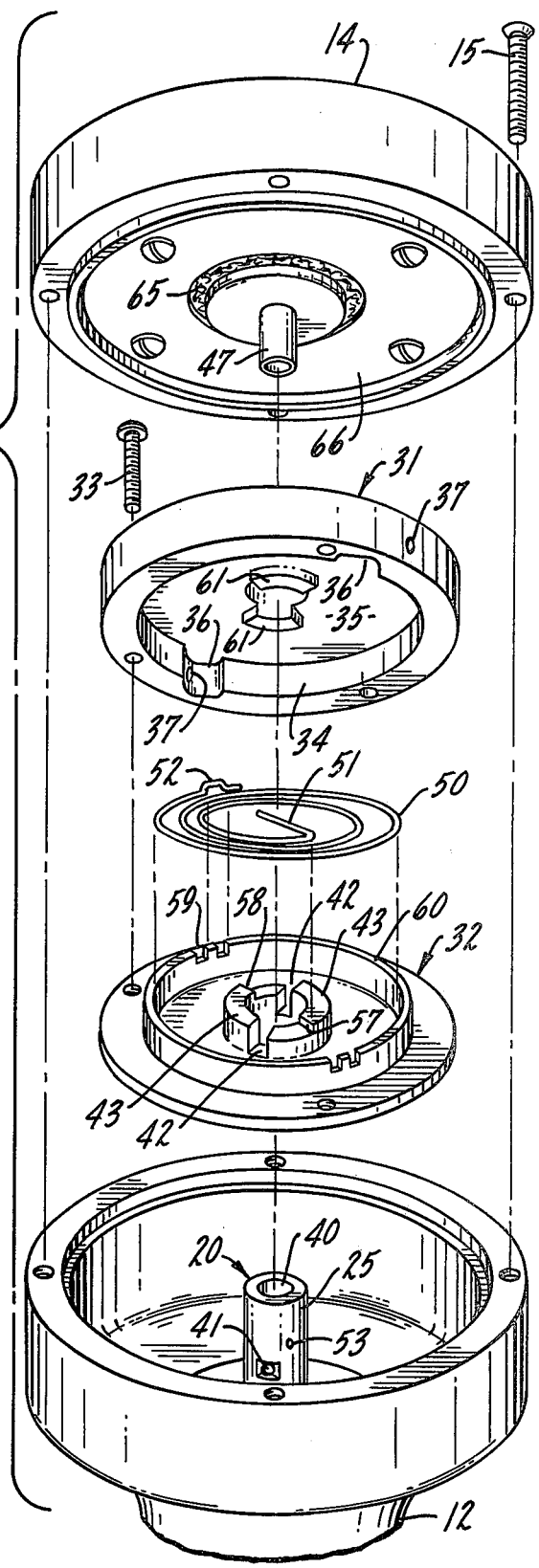

TURBINE TYPE AIR MOTOR

Turbine type air motors have been employed to achieve the high speeds required, for example, for routing and grinding operations. Commonly available motors have extremely poor speed regulation, that is, the speed tends to droop drastically in the face of torque loading. Efforts have been made to improve the speed regulation but the control arrangements for accomplishing this have been relatively expensive and complicated.

It is, accordingly, an object of the present invention to provide a turbine type air motor having good speed regulation in the face of variable torque loading but which is nonetheless of simple and economical construction enabling manufacture and sale at a cost only slightly higher than air motors not having the speed regulation feature. It is another object to provide an air motor having novel provision for manual control.

Other objects and advantages of the invention will become apparent upon reading the attached detailed description and upon reference to the drawings in which:

FIG. 1 shows a perspective external view of a turbine type air motor embodying the present invention;

FIG. 2 is a longitudinal section taken along the line 2—2 in FIG. 1;

FIG. 3 is a cross section looking along the line 3—3 in FIG. 2;

FIG. 4 is a cross sectional view similar to FIG. 3 but showing the relationship of the parts, and particularly the control ports, upon subjecting the device to increased torque loading;

FIG. 5 is a fragmentary section looking along the line 5—5 in FIG. 4;

FIG. 6 is an exploded view showing the parts which make up the housing and rotor in disassembled relation; and FIG. 7 is a longitudinal section of a modified form of the device including an integral, manually operated valve.

FIG. 8 is a fragmentary end view looking along the line 8—8 in FIG. 7.

While the invention has been described in connection with certain preferred embodiments, it will be understood that I do not intend to be limited to the particular embodiments shown but intend, on the contrary, to cover the various alternative and equivalent constructions included within the spirit and scope of the appended claims.

Turning now to the drawings, there is disclosed a turbine type air motor 10 having a housing 11 with a cylindrical barrel 12 and which defines a central chamber 13. The chamber is enclosed at the left-hand end by a cover plate or a cap 14 secured by screws 15. The barrel is conventionally formed with an integral thread 16 for screwing into a suitable fixture or bracket.

Extending through the barrel is a spindle 20 having an outer end 21 mounting a chuck 22 or the like for supporting a rotary tool requiring a high driving speed. The spindle is journaled in axially spaced anti-friction bearings 23, 24 of the precision ball type, with the inner end 25 of the spindle extending rearwardly into the chamber 13.

Telescoped over the rear or inner end of the spindle is a rotor 30 formed of an outer cup 31 and inner cup 32 fitted together, the cups being of shallow annular shape united by screws 33 (FIG. 6) or the like. The cup 31 has a peripheral wall 34 defining a central space 35. The wall is internally relieved with notches 36 (see also FIG. 3) to provide entrance to peripherally oriented orifices 37 which discharge the air in the form of high velocity, generally tangential jets, with the rotor being driven as a result of the reaction force.

In carrying out the present invention, the inner end of the spindle is hollowed out as indicated at 40 and provided with a pair of oppositely extending radial ports 41. The ports 41 are axially aligned with registering ports 42 formed in the cup 32. Adjacent the ports 42 are sectorshaped embossments 43 which, as will be noted, perform a blocking function. For feeding compressed air to the spindle an axial air passage 45 is provided in the cap having an inlet connection 46. Air is conducted from the passage to the hollow of the spindle through a slip joint in the form of a nipple or bushing 46 which may, for example, be of nylon plastic or the like. It will be apparent, then, that when air is admitted through the connection 45 it flows into the hollow end of the spindle thence through the ports 41, 42 into the rotor space 35 for ejection through the orifices 37 and with final escape through ports 48 in the cap.

In carrying out the present invention the rotor 30, instead of being rigidly secured to the inner end of the spindle 20, has provision for limited twisting movement permitting the ports 41, 42 to be moved from a non-registering condition in which the severe throttling of the air takes place to a registering condition in which air may flow relatively freely from the inlet connection 43 through the jet orifices 37. Further in accordance with the invention a biasing spring is interposed between the spindle 20 and rotor 30 for normally maintaining the ports 41, 42 out of registering condition while permitting the spindle 20 to retreat slightly against the force of the biasing spring in the face of torque loading imposed by the tool, so that the ports 41, 42 are moved more nearly into their condition of register. This reduces throttling with increased air flow to the jet orifices, with the result that the torque exerted by the rotor is increased in step with the requirements of the load. Stated in other terms, air flow is increased automatically in accordance with the torque demand so that the speed is maintained at a high level free of the " droop" which normally occurs in turbine type air motors. This is accomplished in the present instance by using a biasing spring 50 coiled in a spiral and having a straight inner end 51 and a hooked, or offset, outer end 52. The end 51 is received in a transversely drilled hole 53 at the inner end of the spindle, with the straight projecting portions 55, 56 serving as movable stops to limit the range of the twisting movement, relatively fixed stops being indicated at 57, 58. The outer or hooked end 52 of the spring is anchored to the member 32 by means of notches 59 in a shallow ring or flange 60 which forms an integral part of the cup 32. For the purpose of maintaining the inner end of the spring axially confined, the cup 31 may have internal sector-shaped embossments 61.

The operation of the device in the face of a change in torque loading will be apparent upon considering FIGS. 3 and 4. FIG. 3 shows the relationship between the spindle and rotor at the reference condition, corresponding to zero or light loading, in which the spindle ports 41 are substantially blocked by embossments 43. Under such conditions severe throttling takes place so that air flows at a limited rate to the jet orifices 37, but nevertheless at a rate adequate to bring the motor, running substantially free, up to rated speed.

When a torque load is imposed on the spindle, such load, acting against the force of the spring 50, causes the spindle to twist or retreat slightly with respect to the rotor 30 which drives it, winding up the spring 50 through a small angle and bringing the ports 41 in the spindle into more complete register with the ports 42 in the rotor. This provides free air flow, as shown in FIGS. 4 and 5 greatly reducing throttling at the ports so that air flows at a faster rate through the jet orifices to increase the torque exerted by the rotor upon the spindle. This increase in torque substantially matches the begetting increase in torque loading, thereby maintaining the speed at a high level, avoiding the severe speed droop which normally occurs when tools of this type are subjected to load.

When the imposed loading is removed, the reverse sequence takes place to increase throttling effect and to prevent overspeed. Thus, unloading the spindle permits the spring to uncoil, back into the unstressed state illustrated in FIG. 3, in which the spindle ports 41 are out of register with the rotor ports 42, resulting in a pinched throttling of the air stream and a reduction in the rate of air flow to the jet orifices. Since the spring reacts simultaneously with removal of the load, and since the rotor, having inertia, requires a finite time to change its speed, the air is correctively throttled before any substantial speed change can occur. The degree of regulation, including freedom from overshoot or undershoot, is surprising considering the simplicity of the control elements, comparing favorably with more elaborate and expensive regulation schemes. As a result of this simplicity turbine type air motors of present design can be manufactured and sold at a cost which is only slightly greater than that of motors of conventional non-regulated type.

Because of the spiral nature of the spring 50, with its mass evenly distributed about the axis, and the limited displacement of the spring over the range of port movement, dynamic balance is accurately maintained insuring smooth vibrationless operation in all degrees of loading.

For the purpose of reducing the noise inherent in air operated devices rotating at high speed, the cap is packed with a body of glass fiber 65 which is held in place by a retaining ring 66.

In a preferred form of the invention a manually manipulated valve is incorporated in the end cap for controlling flow of air into the rotor and to enable the motor to be held and operated as a hand tool. This form of the invention is illustrated in FIGS. 7 and 8, with corresponding elements being indicated by corresponding reference numerals with addition of subscript $a$. Thus, in accordance with the invention, a cap 14$a$ is provided having an axial passage 45$a$ having an inlet connection 46$a$ and terminating in a nipple 47$a$ which projects to form a slip joint connection with the end of the spindle 20$a$. For sealing the passage 45$a$ a valve element 70 is provided in the form of a ball which seats upon the inner end of the barrel 47$a$, being normally held in its sealing position by the pressure of the applied air.

In accordance with the invention a slidable valve plunger is provided in the end cap in radial orientation for unseating the ball and a brake lever, having a shoe adjacent the rotor, is coupled to the valve plunger so that upon release of the plunger the brake is automatically applied to inhibit coasting to bring the rotor promptly to a stop. Thus, referring to FIGS. 7 and 8, a radial bore 71 in the end cap 14$a$ is occupied by a slideable plunger 72 having a tip 73 with a knob 74 at its outer end. The knob is fitted into a correspondingly shaped recess 75. Pivoted in the housing is a brake lever 80 centrally pivoted at 81 and having a brake shoe 82 positioned adjacent the periphery of the rotor. The other end 83 of the lever is in the form of a yoke which straddlingly engages the valve plunger 72. The valve plunger 72 is sealed with respect to the bore 71 and is constantly urged into the illustrated retracted position by the force of the applied air, so that the brake shoe 82 presses against the periphery of the rotor.

In operation, pressing the knob 74 to urge the plunger 72 inwardly causes the tip 73 thereof to unseat the ball so that compressed air may flow to the rotor, the brake shoe 82 being simultaneously retracted. When the knob 74 is released the force of the compressed air moves the plunger 72 radially outward, permitting the ball 70 to again occupy its seated position and rocking the brake lever 80 counterclockwise to urge the shoe against the spinning rotor, promptly bringing it to a stop.

What is claimed is:

1. In a turbine type air motor, the combination comprising a housing, a rotor in the housing, means for feeding compressed air to the rotor, the rotor having an inlet and tangentially directed orifices for producing air jets for driving of the rotor, a rotor spindle mounted in the rotor for limited relative twisting movement and having means at its end for attachment of a rotary tool, means defining an adjustable throttle valve in the rotor interposed between the inlet and the orifices and responsive to the relative phase position of the spindle and rotor, and biasing means for biasing the spindle into a reference position with respect to the rotor in which the throttle valve is only partly open for throttling of air when the spindle is lightly loaded, with the retreating movement of the spindle against the biasing means when the spindle is more heavily loaded serving to open the throttle valve to produce a corresponding increase in driving torque.

2. In a turbine type air motor, the combination comprising a housing, a rotor in the housing, means for feeding compressed air to the rotor, the rotor having an inlet and tangentially directed orifices for producing air jets for driving the rotor, a rotor spindle mounted in the rotor for limited relative twisting movement with respect to it and having means at its end for attaching a rotary tool, a throttle valve in the rotor interposed between the inlet and the orifices, the throttle valve being formed of a port in the spindle and a cooperating port in the rotor, biasing means interposed between the rotor and the spindle for biasing the spindle into a reference phase position in which the two ports are out of register so that the air discharged at the jets is throttled when the spindle is lightly loaded and with increased torque loading of the spindle being accompanied by movement of the spindle port into register with the rotor port for increased discharge of air in the jets.

3. In a turbine type air motor, the combination comprising a housing, a spindle mounted for rotation in the housing, a rotor telescoped over one end of the spindle, means at the other end of the spindle for attachment of a rotary tool, the spindle being of hollowed-out construction, means defining limits of twisting movement between the spindle and the rotor, cooperating ports in the spindle and rotor for admitting air from the spindle into the rotor, means defining orifices at the periphery of the rotor for producing tangentially directed air jets, and biasing means interposed between the spindle and rotor for urging the spindle in a direction to move the ports out of register for throttling of air when the spindle is lightly loaded and with retreating movement of the spindle in the face of loading and against the force of bias serving to twist the spindle into a position relative to the rotor in which the ports are in register thereby to provide an increased flow of air through the orifices increasing the driving torque in step with the load imposed upon the tool, the spindle extending entirely through the rotor, and means for feeding air to the presented hollow end of the spindle.

4. In a turbine type air motor, the combination comprising a housing having a hollow body portion and an axially extending barrel, a spindle journalled in the barrel having means for connecting a rotary tool at its outer end and projecting into the body portion at its inner end, an annularly shaped rotor in the body portion of the housing snugly telescoped over the inner end of the spindle, the inner end of the spindle being of hollow construction and having a radial port, the rotor having a cooperating radial port and having peripheral, tangentially directed orifices, means for conducting compressed air into the hollow of the spindle which, passing through the ports, is conducted to the orifices for driving of the rotor and spindle, a spring interposed between the rotor and the spindle for normally urging the ports thereon out of register so that the air furnished to the orifices is throttled when the spindle is lightly loaded by the tool but with retreating movement of the spindle against the spring in the face of increased torque loading serving to move the spindle into a position in which the ports are more nearly in register thereby to augment flow of air through the orifices for generation of torque in proportion to the applied load, and means adjacent the rotor for enclosing the hollow body portion of the housing.

5. The combination as claimed in claim 4, the spindle having an opening for receiving the end of the spring thereby to inhibit relative axial movement between the rotor and spindle.

6. The combination as claimed in claim 4 in which the body portion of the housing has an enclosing end cap having an axial air inlet opening and means including a slip joint in the form of a bushing interposed between the inlet opening and the presented hollow end of the spindle for conducting compressed air from the inlet into the spindle notwithstanding rotation of the spindle.

7. The combination as claimed in claim 6 in which the end cap has orifices for venting of the air in the housing and in which porous sound deadening material is provided adjacent the orifices for reducing the sound level in the air flowing therefrom.

8. In a turbine type air motor, the combination comprising a housing having a body portion defining a chamber and having a barrel extending therefrom, a spindle journalled in the barrel and having means at its outer end for attachment of a tool and having an inner end extending into the chamber, a hollow annular rotor mounted in the chamber and supported on the inner end of the spindle, the rotor having tangential orifices, means on the rotor defining limits of relative twisting movement of the spindle, the inner end of the spindle being hollow and having a radial port, a cooperating radial port in the rotor, means including an axial air inlet connection for feeding compressed air into the hollow of the spindle so that air is conducted through the ports to the orifices, and a torsional spring in the hollow rotor and interposed between the spindle and the rotor for urging the spindle in a reference position in which the ports are substantially out of register for throttling the air fed to the orifices under light load conditions and for permitting retreating movement of the spindle against the force of the spring when the torque loading upon the tool is increased thereby to bring the ports into register for increased flow of air through the orifices resulting in an increase in driving torque to match the increase in load torque thereby to achieve more constant speed under conditions of variable loading, the torsional spring being formed as a spiral centered about the spindle axis for maintenance of dynamic balance in all conditions of adjustment of the ports.

9. In a turbine type air motor, the combination comprising a housing having a hollow body portion and an axially extending barrel, a spindle journaled in the barrel having means for connecting a rotary tool at its outer end and projecting into the hollow body portion at its inner end, an annularly shaped rotor mounted on the inner end of the spindle, the rotor having tangentially directed orifices, the inner end of the spindle being hollow and having ports communicating with the orifices, an end cap for enclosing the housing, the end cap having an axial compressed air inlet connection and having a nipple providing a slip joint between the connection and the spindle for conducting compressed air to the latter, a valve seat interposed between the inlet and the nipple with a cooperating unseatable valve element, a valve plunger slidably mounted in the end cap with the inner end thereof adjacent the valve element and with the outer end accessible for manual manipulation so that when the outer end is pressed the valve element is unseated thereby to admit compressed air into the motor, the valve plunger being outwardly biased so that the valve element may restore itself to seated position when the valve plunger is released, the housing including a brake member coupled to the valve plunger and including a brake shoe at one end adjacent the periphery of the rotor, the outward bias of the plunger causing the shoe to engage the periphery of the rotor to inhibit coasting and to bring the rotor promptly to a stop.

10. In a turbine type air motor, the combination comprising a housing having a hollow body portion and an axially extending barrel, a spindle journaled in the barrel having means for connecting a rotary tool at its outer end and projecting into the hollow body portion at its inner end, an annularly shaped rotor mounted on the inner end of the spindle, the rotor having tangentially directed orifices, the inner end of the spindle being hollow and having ports communicating with the orifices, an end cap for enclosing the housing, the end cap having an axial compressed air inlet connection and having a nipple providing a slip joint between the connection and the spindle for conducting compressed air to the latter, a valve seat interposed between the inlet and the nipple with a cooperating unseatable valve element, a valve plunger slidably mounted in the end cap with the inner end thereof adjacent the valve element and with the outer end accessible for manual manipulation so that when the outer end is pressed the valve element is unseated thereby to admit compressed air into the motor, the valve plunger being outwardly biased so that the valve element may restore itself to seated position when the valve plunger is released, the valve seat being formed at the outer end of the nipple and the valve element being in the form of a ball held against the seat by the force of the compressed air at the inlet but displaceable from the seat by means of the plunger.

11. In a turbine type air motor, the combination comprising a housing having a hollow body portion and an axially extending barrel, a spindle journaled in the barrel having means for connecting a rotary tool at its outer end and projecting into the hollow body portion at its inner end, an annularly shaped rotor mounted on the inner end of the spindle, the rotor having tangentially directed orifices, the inner end of the spindle being hollow and having ports communicating with the orifices, and end cap for enclosing the housing, the end cap having an axial passage with a compressed air inlet connection at its outer end and having a nipple at its inner end projecting to form a slip joint connection with the spindle for conducting compressed air to the rotor, means defining a radial bore in the end cap communicating with the axial passageway, a manually operated plunger fitted in the bore, a valve element in the passageway for sealing the nipple and in the path of movement of the inner end of the plunger so that when the plunger is depressed the valve element is dislodged to admit compressed air to the rotor, a brake lever mounted in the housing and having a shoe at one end adjacent the rotor, the other end of the lever being connected to the plunger, the inner end of the plunger being outwardly biased by the compressed air in the passageway so that when the plunger is released the brake lever is forcibly rocked to bring the shoe into frictional engagement with the rotor to inhibit coasting and to bring the rotor promptly to a stop.

* * * * *